United States Patent [19]

Bhagat et al.

[11] Patent Number: 5,144,648
[45] Date of Patent: Sep. 1, 1992

[54] METHOD AND APPARATUS FOR PROCESSING PAGES

[75] Inventors: Jai P. Bhagat, Jackson, Miss.; Robert L. Vence, Arlington, Va.; William D. Hays, Jackson, Miss.

[73] Assignee: Mobile Telecommunication Technologies, Jackson, Miss.

[21] Appl. No.: 702,121

[22] Filed: May 16, 1991

Related U.S. Application Data

[63] Continuation of Ser. No. 400,679, Aug. 30, 1989, abandoned.

[51] Int. Cl.⁵ .................. H04M 3/50; H04Q 7/04
[52] U.S. Cl. .......................... 379/57; 379/88; 379/89; 379/212; 340/825.44; 340/825.48
[58] Field of Search ............... 379/88, 89, 67, 212, 379/213, 57, 56, 211; 340/825.44, 825.49, 825.48

[56] References Cited

U.S. PATENT DOCUMENTS

| | | | |
|---|---|---|---|
| 4,072,824 | 2/1978 | Phillips | 379/70 |
| 4,178,476 | 12/1979 | Frost | 379/59 |
| 4,191,860 | 3/1980 | Weber | 379/115 |
| 4,247,908 | 1/1981 | Lockhart, Jr. et al. | 364/900 |
| 4,490,579 | 12/1984 | Godoshian | 340/825.44 |
| 4,625,081 | 11/1986 | Lotito et al. | 379/88 |
| 4,642,425 | 2/1987 | Guinn, Jr. et al. | 379/57 |
| 4,658,416 | 4/1987 | Tanaka | 379/57 |
| 4,674,115 | 6/1987 | Kaleita et al. | 379/201 |
| 4,701,943 | 10/1987 | Davis et al. | 379/57 |
| 4,706,270 | 11/1987 | Astegiano et al. | 379/2 |
| 4,713,808 | 12/1987 | Gaskill et al. | 370/94.1 |
| 4,747,122 | 5/1988 | Bhagat et al. | 379/57 |
| 4,797,910 | 1/1989 | Daudelin | 379/67 |
| 4,811,379 | 3/1989 | Grandfield | 379/57 |
| 4,837,804 | 6/1989 | Akita | 379/88 |
| 4,847,890 | 7/1989 | Solomon et al. | 379/67 |
| 4,852,149 | 7/1989 | Zwick et al. | 379/67 |
| 4,853,952 | 8/1989 | Jachmann et al. | 379/88 |
| 4,868,560 | 9/1989 | Oliwa et al. | 340/825.44 |
| 4,875,038 | 10/1989 | Siwiak et al. | 340/825.44 |
| 4,876,707 | 10/1989 | Hashimoto | 379/57 |
| 4,878,239 | 10/1989 | Solomon et al. | 379/67 |
| 4,878,240 | 10/1989 | Lin et al. | 379/67 |
| 4,882,744 | 11/1989 | Hashimoto | 379/57 |
| 4,885,577 | 12/1989 | Nelson | 340/825.44 |
| 4,926,460 | 5/1990 | Gutman et al. | 379/57 |
| 4,926,462 | 5/1990 | Ladd et al. | 379/67 |
| 4,941,167 | 7/1990 | Cannalte et al. | 379/67 |
| 4,941,203 | 7/1990 | Patsiokas et al. | 455/53 |
| 4,942,598 | 7/1990 | Davis | 379/57 |

FOREIGN PATENT DOCUMENTS 3415478 10/1985 Fed. Rep. of Germany.
2173071 10/1986 United Kingdom.

Primary Examiner—Thomas W. Brown
Attorney, Agent, or Firm—Finnegan, Henderson, Farabow, Garrett & Dunner

[57] ABSTRACT

A paging system includes a digital switch, an interface processor, and a central computer. The interface processor voice prompts a caller to input a desired function code and in response, performs the desired function or instructs the digital switch to route the call to a different portion of the paging system which may include a voice mailbox unit for recording voice messages. The digital switch, in response to an instruction from the interface processor, can establish a telephone connection to an outside number for a caller already connected to the paging system.

8 Claims, 4 Drawing Sheets

METHOD AND APPARATUS FOR PROCESSING PAGES

This application is a continuation of application Ser. No. 07/400,679, filed 08/30/89 abandoned.

BACKGROUND OF THE INVENTION

1. Field of the Invention

The present invention relates to a paging system for transmitting numeric and alphanumeric pages and for recording voice messages.

2. Description of the Related Art

Paging systems are known and used to transmit pages on both a regional and national level. Each subscriber to a paging system is issued a pager having a unique pager identification number (PIN) and subscribes to selected services offered by the paging system.

Many conventional paging systems include a central computer for storing subscriber information, including PIN number, security code and types of services subscribed to. Pages called into these systems are processed by the central computer, sent to a transmitter and broadcast in the region corresponding to the subscriber's location. Transmission of the pages may be performed by satellite which allows subscribers to be paged anywhere in the country.

One such paging system is the National Satellite Paging System (NSP). As shown in FIG. 1, the NSP comprises a central computer 100, an alphanumeric speech unit 102, a voice mailbox unit 104 and channel banks 106. The central computer 100 comprises, for example, a MicroVAX computer available from Digital Equipment Corporation which, as described above, stores subscriber information and processes pages to be broadcast. This processing includes preparation of the pages into the proper protocol for transmission to a satellite (not shown) via satellite uplink 108 or to a local transmitter 110. In addition, the central computer 100 provides administrative and accounting functions, such as billing functions. The alphanumeric speech unit 102 is comprised of DECTALK interface units, also available from Digital Equipment Corporation, which provides voice prompting to a caller wishing to leave a page for a subscriber, in accordance with instructions from the central computer 100. The voice mailbox unit 104 comprises a BBL EVXTRA unit, available from BBL Industries, which provides voice prompting for a caller wishing to leave a recorded message for a subscriber. Channel banks 106 comprise intelligent T-1 channel banks available from Newbride Corp. and convert digital T-1 input lines into analog lines.

The NSP is capable of processing both numeric and alphanumeric pages and recording voice messages The numeric and alphanumeric page service provided by the NSP is termed the "SKYPAGER" ® service and the voice message service is termed the "SKYTALK" ® service. An example of each service and the corresponding system and processing will now be described.

If a caller wishes to page a subscriber with a numeric or alphanumeric page, the caller is connected with the NSP system by dialing 1-800-SKYPAGE. A numeric page generally refers to a message consisting only of numbers, such as a phone number at which the caller can be reached, and an alphanumeric page refers to any message including, but not limited to, numbers, letters, symbols and punctuation. The call comes into the alphanumeric speech unit 102 via a digital T1 line and channel bank 106. In response to the call, the alphanumeric speech unit 102 establishes a connection with the central computer 100 via one of several RS-232 ports. The central computer 100 instructs the alphanumeric speech unit 102 to welcome the caller to SKYPAGE and sequentially instructs the caller to enter the PIN of the subscriber and a numeric or alphanumeric message (usually a return phone number). The central computer 100 also reviews the subscriber's file (corresponding to the input PIN) to determine what type of services the subscriber is entitled to receive, processes the page into the appropriate protocol and transmits the page to the local transmitter 110 or a satellite uplink 108.

If a caller wishes to leave a voice message for a subscriber, he or she does so by dialing 1-800-SKYTALK. This call comes into the voice mailbox unit 104 via a digital T1 line and channel bank 106. In response to the call, the voice mailbox unit 104 sequentially instructs the caller to enter the PIN of the subscriber and a message. The message is recorded, for example on disk drives, at a storage area dedicated to the subscriber. Once the message is obtained and the caller disconnected, the voice mailbox unit 104 establishes communication with the central computer 100 using a Telocator Network Paging Protocol (TNpp, which is an open protocol for communications between paging terminals developed by Telocator) and informs the central computer 100 that the subscriber corresponding to the PIN entered by the caller has a message stored in the voice mailbox unit 104. The central computer 100 updates the subscriber's file with this information and transmits a page to the subscriber instructing the subscriber to call into SKYTALK and retrieve the message.

To retrieve a SKYTALK message, the subscriber dials 1-800-SKYTALK and, in response to voice prompts from the voice mailbox unit 104, inputs the appropriate information (PIN and function code) to effect play back of the message.

The NSP system is thus an efficient and comprehensive paging system offering its subscribers a wide range of services. However, the NSP system suffers from a number of disadvantages which limit its performance and unnecessarily elevate its costs. Specifically, as described above with respect to numeric and alphanumeric pages, the central computer 100 provides all of the page processing and administrative and accounting functions as well as the processing for SKYTALK and SKYPAGER transmission services. Expansion of the system is, therefore, very expensive since a larger central computer is required for expansion. Further, the central computer 100 can only process a limited number of calls at one time, which limits its ability to meet subscriber demands.

The NSP system is also limited in its functionality which tends to inconvenience subscribers While the NSP system does provide both SKYPAGER and SKYTALK services, a subscriber must use two different phone numbers to get these two different services. The system does not enable a subscriber to switch between these two services after an initial call into the system. For example, if a subscriber wishes to retrieve both numeric pages (which may be held for later retrieval) and voice messages, the subscriber must first call 1-800-SKYPAGE to retrieve the numeric pages then hang up and call 1-800-SKYTALK to retrieve the voice messages. This is both inconvenient and expensive.

Furthermore, the NSP system does not offer a subscriber the ability to dial out a phone number of a caller who has left a message and establish a phone connection via the NSP system to return the caller's message. For example, if a subscriber calls into SKYPAGER to retrieve numeric pages and desires to immediately return one of the phone calls, the subscriber must memorize or write down the phone number, assuming that the number is not already known, hang up the phone and dial the person directly. This, again, is both inconvenient and expensive.

SUMMARY OF THE INVENTION

Accordingly, it is an object of the present invention to provide a paging system which is readily expandable in response to increases in demand.

It is another object of the present invention to provide a paging system having expanded functionality and providing a variety of services which are both convenient and cost saving to subscribers.

To accomplish these and other objects, and in accordance with the purposes of the invention as embodied and broadly described herein, a paging system is provided comprising digital switch means for receiving phone calls via phone lines connected thereto and for switching said phone calls to appropriate portions of said paging system; interface processor means for providing voice prompts to callers and for performimg paging functions based on function codes input by the caller; and central computer means for storing subscriber files and for preparing pages according to a selected protocol.

BRIEF DESCRIPTION OF THE DRAWINGS

The accompanying drawings, which are incorporated in and constitute a part of the specification, illustrate a presently preferred embodiment(s) and method of the invention and, together with the general description given above and the detailed description of the preferred embodiment(s) and method given below, serve to explain the principles of the invention. Of the drawings.

DESCRIPTION OF THE PREFERRED EMBODIMENT

Reference will now be made in detail to the presently preferred embodiment(s) and method(s) of the invention as illustrated in the accompanying drawings.

Figure 1:
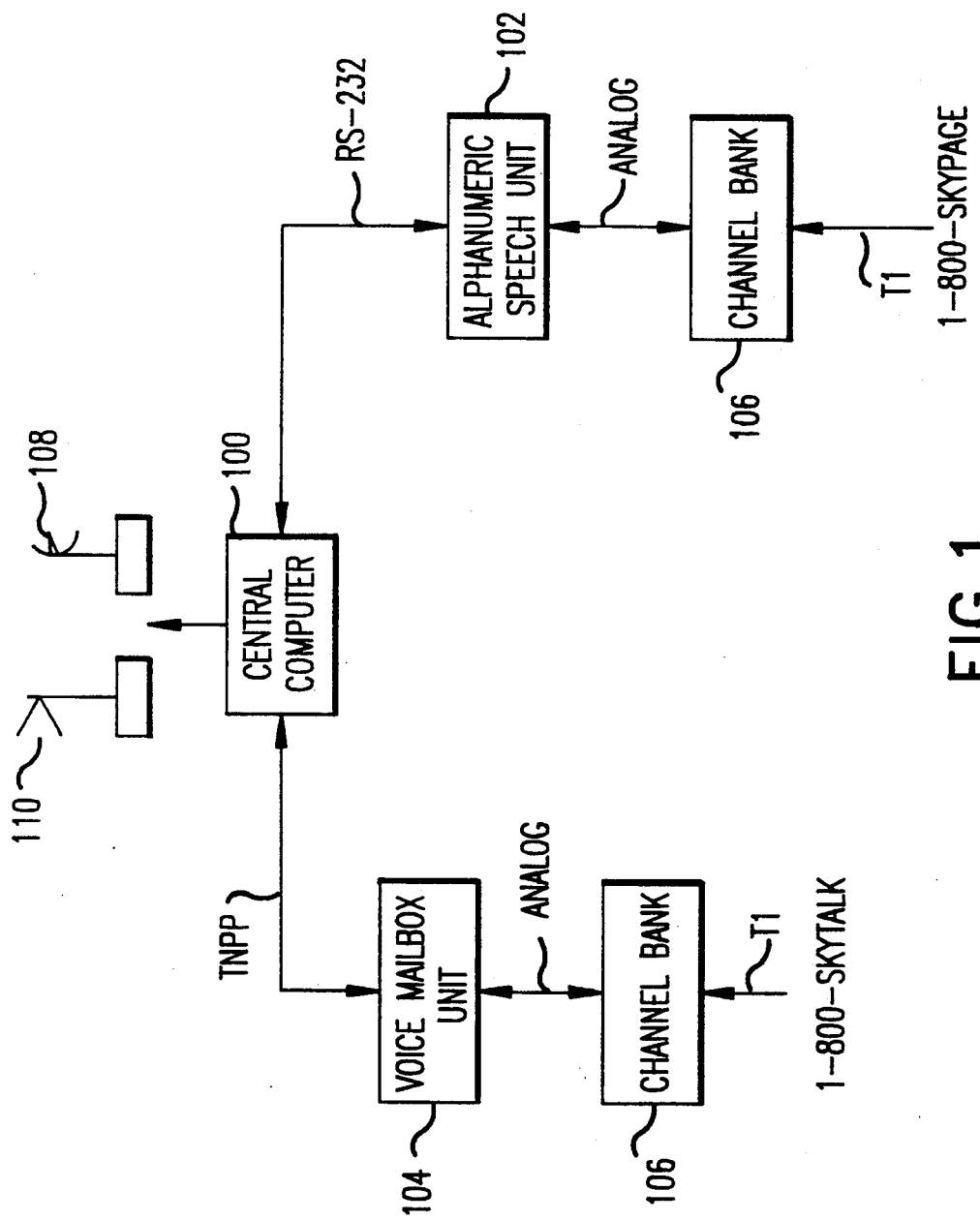
FIG. 1 is a block diagram of the National Satellite Paging System.
Figure 2:
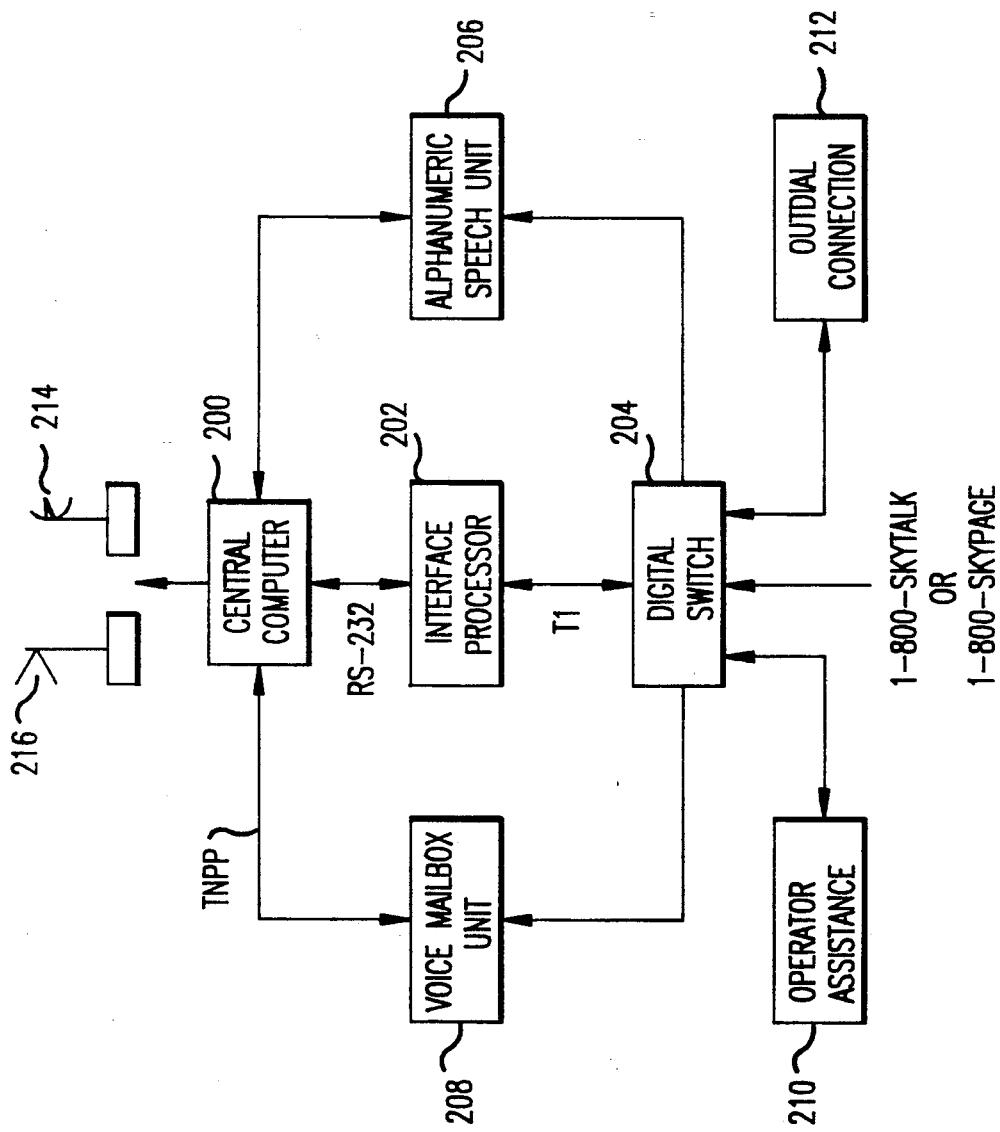
FIG. 2 is a block diagram of a preferred embodiment of the paging system of the present invention.

As shown in FIG. 2, a paging system in accordance with the present preferred embodiment of the invention comprises a central computer 200, an interface processor 202, a digital switch 204, an alphanumeric speech unit 206 and a voice mailbox unit 208.

The central computer 200 may comprise, for example, a DEC MicroVAX and performs page processing and administrative and accounting functions similar to the conventional NSP system. However, due to the interface processor 202 and digital switch 204, the central computer 200 of the present invention does not perform caller interface processing. This frees up the central computer 200 to perform additional processing functions.

The interface processor 202 may comprise, for example, a PERIPHONICS VPS 9500 computer and provides initial voice prompting for any incoming call. In addition, the interface processor 202 responds to function codes input by callers to perform a variety of services.

The digital switch 204 may comprise, for example, a Harris Inc. digital switch for switching calls to the appropriate part of the system in accordance with instructions from the interface processor 202. The use of such a digital switch 204 frees up the interface processor ports to handle additional incoming calls. Depending upon the function code input by the caller, the digital switch 204 may transfer the call to the voice mailbox unit 208 to provide a voice message service such as the SKYTALK service, to a system operator 210 if the caller needs assistance, to an "outdial" line 212 (described below) or, in the event the subscriber can receive alphanumeric pages, to the alphanumeric speech unit 206.

Figure 3:
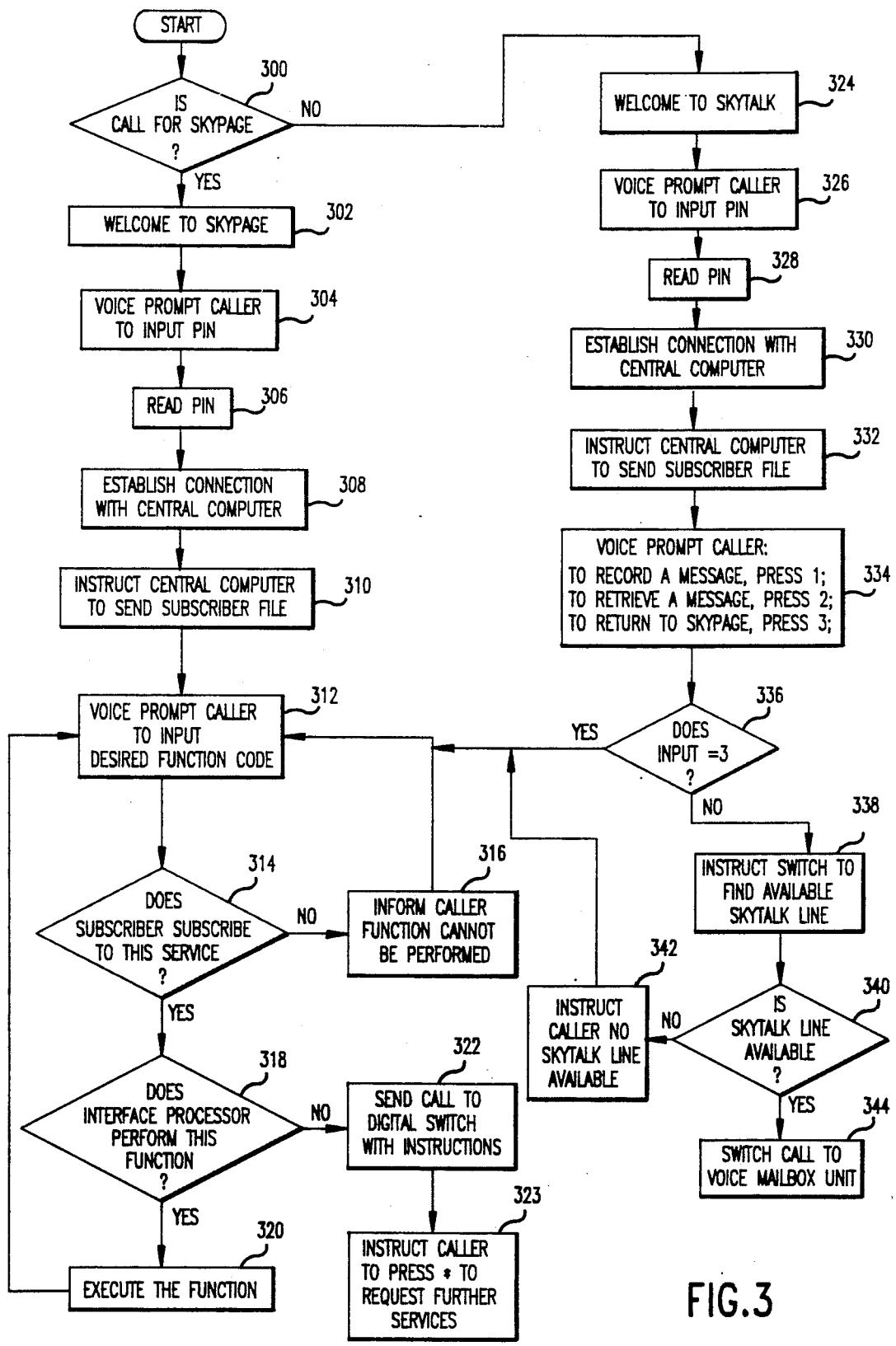
FIG. 3 is a flow chart of the system processing for performing SKYPAGE and SKYTALK services in accordance with the preferred embodiment of the present invention.

Operation of the paging system in accordance with the preferred embodiment will now be described for both SKYPAGER and SKYTALK services with reference to the flowchart of FIG. 3. When either a SKYPAGER or SKYTALK call is made into the paging system, it is received by the digital switch 204 and forwarded to one port of the interface processor 202. The interface processor analyzes the call to determine if it is a SKYPAGER or SKYTALK call 300. If the call is a SKYPAGER call, a voice prompt is provided by the interface processor 202 welcoming the caller to SKYPAGER 302 and instructing the caller to input a subscriber PIN 304. Interface processor 202 then reads the PIN 306. Once the interface processor 202 has the PIN, it establishes a connection via RS-232 lines with the central computer 200, 308, and instructs the central computer 200 to send the subscriber file corresponding to the PIN to the interface processor 202, 310. The central computer 200 down loads the subscriber file to the interface processor 202 and is then free to perform other processing functions.

Once the interface processor 202 has the appropriate subscriber file, it provides a voice prompt to the caller to input a desired function code 312. After the caller inputs the function code, the interface processor 202 determines whether the subscriber subscribes to the service corresponding to the function code. For example, if the caller inputs a function code corresponding to sending a national page, but the subscriber does not subscribe to the national page service of the paging system, the interface processor 202 would inform the caller that this function 316 cannot be performed. If the subscriber does subscribe to this service, the interface processor 202 determines if the function is one that is executed by the interface processor 202, 318. If the interface processor 202 does perform the function (for example providing a numeric page), it executes the function 320; if not, the interface processor 202 sends the call to the digital switch 204 with instructions to transfer the call to the appropriate part of the paging system 322. For example, if the caller inputs a function code corresponding to a request for operator assistance (which is not performed by the interface processor 202)

the interface processor 202 instructs the digital switch 204 to establish a line connection to the operator 210 and transfers the call to the digital switch 204 with instructions to forward the call to the operator 210. The interface processor 202 also instructs the caller to press a selected key (for example a "*" key) to request further services after the operator assistance service 323.

If the initial input call is a SKYTALK call, the interface processor 202 welcomes the caller to SKYTALK 324 and instructs the caller to input the subscriber's PIN 326. The interface processor 202 then reads the PIN 328, establishes a connection with the central computer 200 via RS-232 lines 330 and instructs the central computer 200 to transfer the subscriber file corresponding to the PIN to the interface processor 202, 332. The interface processor 202 then provides a voice prompt to the caller providing, for example, three options 334: to record a message, press 1; to retrieve a message, press 2; to return to SKYPAGER, press 3. If the caller inputs a 3, the interface processor 202 returns to the SKYPAGER processing routine described above and voice prompts the caller to input a desired function code 312. If the caller inputs a 1 or 2, the interface processor 202 instructs the digital switch 204 to find an available line to the voice mailbox unit 208, 338 and 340. If a line is available, the digital switch 204 transfers the call to the voice mailbox unit 208, 344 and instructs the caller to press a selected key (for example a * key) to request further services after the SKYTALK service is complete 323. If a line is not available to the voice mailbox unit 208, the caller is so instructed 342. The voice mailbox unit 208 may comprise a BBL EVXTRA computer and processes SKYTALK calls in a manner similar to that of the NSP system described above.

The foregoing description shows the ability of the paging system of the present invention to switch back and forth between SKYPAGER and SKYTALK services with just one call into the system. Further, the preferred embodiment of the present paging system can switch directly from the SKYPAGER service to SKYTALK service in response to the appropriate function code. For example, if a subscriber has called in to retrieve numeric pages (SKYPAGER service), but also wants to retrieve his recorded messages from the voice mailbox unit 208 (SKYTALK service), after the interface processor has executed a "review held pages" function 320 (described below), the subscriber, in response to a voice prompt to input a desired function code 312, need only insert a SKYTALK function code. In response, the interface processor 202 next processes step 334 and continues processing the SKYTALK request in the manner described above.

As indicated above, the present paging system can perform a "hold pages" function and a "review held pages" function. If a subscriber does not wish to be paged for a period of time, he or she simply calls into the paging system and inputs the "hold pages" function code. The subscriber can then call in at a later time to review the pages held by inputting a "review held pages" function code.

Figure 4:
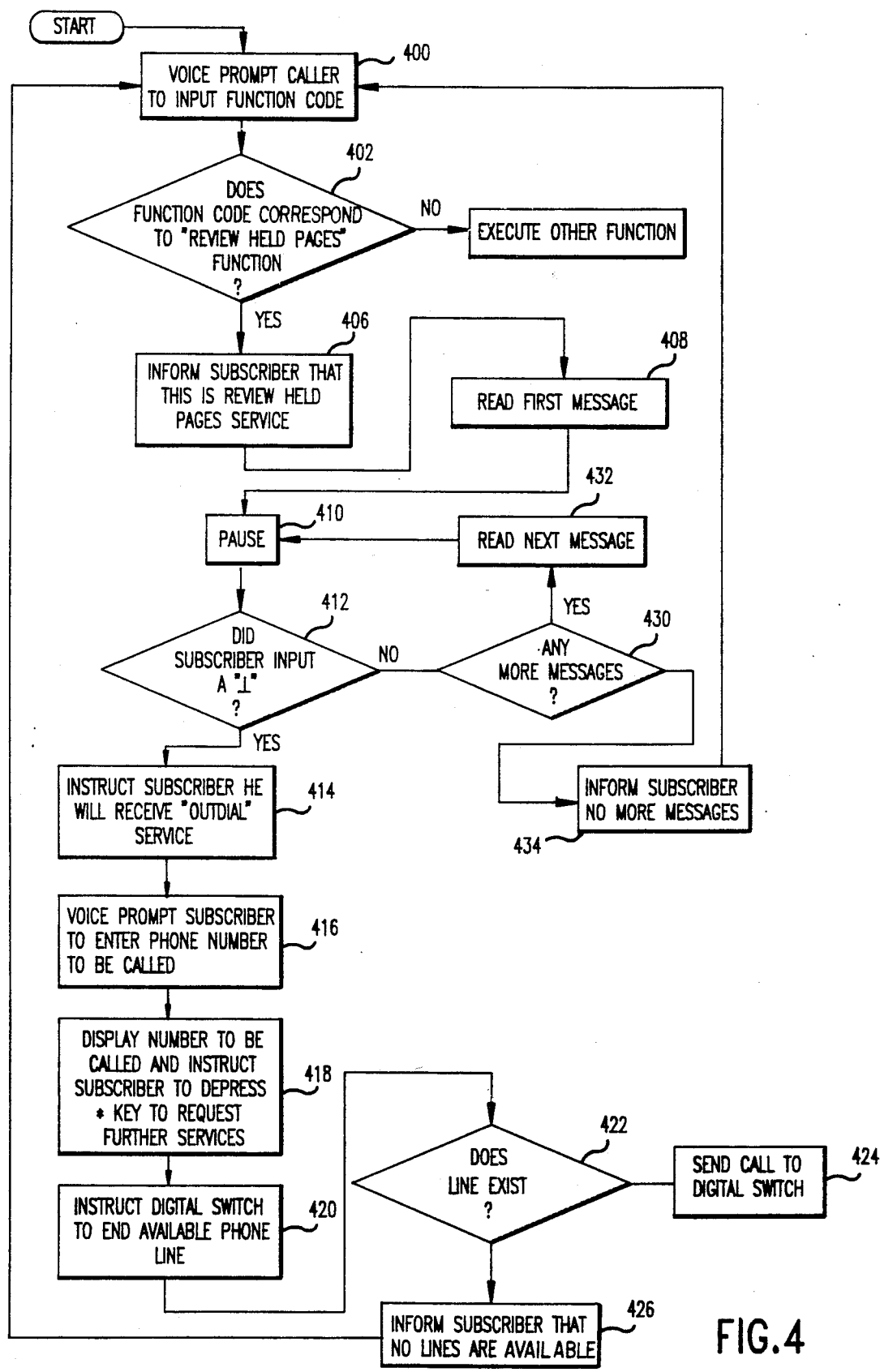
FIG. 4 is a flow chart of the system processing for performing a switching function in accordance with the preferred embodiment of the present invention.

A further feature of the paging system of the present invention is its ability to switch a presently connected caller to an outside phone line without requiring the caller to disconnect from the paging system and dial the person directly. This "outdial" feature will be described in conjunction with a "review held pages" function and the flowchart of FIG. 4.

As previously indicated, a subscriber wishing to review held pages simply inputs the appropriate function code. The interface processor 202 voice prompts the caller to input the function code 400. If the function code corresponds to the "review held pages" function 402 the interface processor 202 informs the subscriber that the system will review the held pages 406, reads back the first numeric page to the subscriber 408 and pauses 410.

The "outdial" function can be initiated by depressing a selected key, for example a "1" key 412. If the subscriber inputs a "1" during the "review held pages" processing the interface processor 202 informs the subscriber that he or she will receive the "outdial" service 414 and instructs the subscriber to enter the phone number he or she wishes to call 416. After the subscriber inputs the phone number, this phone number is displayed to the subscriber 418 and the subscriber is instructed to depress, for example, the "*" key to obtain further services after the phone call. Assuming the subscriber does not cancel the call, the interface processor 202 instructs the digital switch 204 to find an available "outdial" phone line 420. If a phone line exists, the subscriber's call is transferred to the digital switch 204, 422 and 424 and the "outdial" connection 212 is made. If no "outdial" line is available, the subscriber is so informed 422 and 426.

If the subscriber does not input a "1" to receive the "outdial" service while the pages are being reviewed, the interface processor 202 determines if there are any messages remaining for review 430. If none remain, the subscriber is so informed 434 and voice prompted to input a new function code 400. If additional messages remain, these messages are sequentially read to the subscriber 432.

While the foregoing description describes the "outdial" function during a "review held pages" function, the "outdial" function can be provided anytime a caller is connected to the paging system by inputting a selected "outdial" function code in response to a voice prompt to do so. The system then performs the "outdial" processing in a manner described above with respect to steps 414 through 426 of FIG. 4. This feature of the present invention is advantageous in that it allows a subscriber to make one call into the paging system and receive the "outdial" service without having to disconnect from the system and dial a person directly.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. An apparatus for providing numeric and alphanumeric paging services and voice-mail services to callers, comprising:
   a central computer means connected to a transmitter for preparing pages for transmission;
   a voice-mail unit separate from and connected to said central computer means for recording and playing back voice messages;
   an alphanumeric speech unit separate from and connected to said central computer means for verbalizing alphanumeric messages;

a digital switch means connected to said voice-mail unit and said alphanumeric speech unit;

an interface processor means connected to said central computer means and said digital switch means for obtaining information for a page from a caller when the caller inputs a function code corresponding to a paging service;

for issuing a first instruction to connect the caller to said voice-mail unit when the caller inputs a function code corresponding to a voice-mail service; and for issuing a second instruction to connect the caller to said alphanumeric speech unit when the caller inputs a function code corresponding to a request to review stored alphanumeric pages;

said digital switch means being provided for receiving telephone calls;

for forwarding the telephone calls to said interface processor means;

for switching the caller to said voice-mail unit when said interface processor means issues said first instruction; and for switching the caller to said alphanumeric speech unit when said interface processor means issues said second instruction.

2. An apparatus according to claim 1, wherein said interface processor means instructs the caller to enter a desired function code.

3. An apparatus according to claim 1, wherein said interface processor means is further provided:

for recognizing an "outdial" function code input by the caller, said "outdial" function code corresponding to a request by the caller currently connected to the interface processor means to establish a telephone connection with a terminal having a predetermined telephone number;

for instructing the caller to input a telephone number to be called in response to recognizing the "outdial" function code; and for issuing a third instruction to establish a telephone connection to a terminal having the telephone number input by the caller; and wherein said digital switch means is further provided:

for establishing a telephone connection between the caller and the terminal having the telephone number input by the caller when said interface processor means issues the third instruction.

4. A method of operating a system for providing numeric and alphanumeric paging services and voice-mail services to callers, which includes a central computer, a voice-mail unit, an alphanumeric speech unit, a digital switch and an interface processor, comprising the steps of:

receiving a telephone call at said digital switch;

forwarding the telephone call to said interface processor;

obtaining, at said interface processor, information for a page from a caller when the caller inputs a function code corresponding to a paging service; and issuing a first instruction at said interface processor to connect the caller to said voice-mail unit when the caller inputs a function code corresponding to a voice-mail service; or issuing a second instruction at said interface processor to connect the caller to said alphanumeric speech unit when the caller inputs a function code corresponding to a request to review stored alphanumeric pages.

5. A method according to claim 4, further comprising the steps of switching the caller to said voice-mail unit when said interface processor issues said first instruction; or switching the caller to said alphanumeric speech unit when said interface processor issues said second instruction.

6. A method according to claim 4, further comprising the step of instructing the caller to enter a desired function code.

7. A method according to claim 4, further comprising the steps of:

recognizing, at said interface processor, an "outdial" function code input by the caller, said "outdial" function code corresponding to a request by the caller currently connected to the system to establish a telephone connection with a terminal having a predetermined telephone number;

instructing the caller to input a telephone number to be called in response to recognizing the "outdial" function code; and issuing a third instruction at said interface processor to establish a telephone connection to the telephone number input by the caller.

8. A method according to claim 7, further comprising the step of, establishing a telephone connection between the caller and the terminal having a predetermined telephone number input by the caller when said interface processor issues said third instruction.

* * * * *